United States Patent [19]

Lee

[11] Patent Number: 5,054,098
[45] Date of Patent: Oct. 1, 1991

[54] METHOD OF DETECTING THE SKEW ANGLE OF A PRINTED BUSINESS FORM

[75] Inventor: Yongchun Lee, Rochester, N.Y.

[73] Assignee: Eastman Kodak Company, Rochester, N.Y.

[21] Appl. No.: 526,426

[22] Filed: May 21, 1990

[51] Int. Cl.⁵ .............................................. G06K 9/32
[52] U.S. Cl. ........................................ 382/46; 382/9; 382/45; 382/44
[58] Field of Search ................... 382/46, 45, 41, 9, 61, 382/22; 364/519; 340/727, 723, 724; 358/465, 466, 481, 486, 488

[56] References Cited

U.S. PATENT DOCUMENTS

| | | | |
|---|---|---|---|
| 4,620,288 | 10/1986 | Welmers | 364/518 |
| 4,689,824 | 8/1987 | Mitchell et al. | 382/46 |
| 4,759,075 | 7/1988 | Lipkie et al. | 382/46 |
| 4,759,076 | 7/1988 | Tanaka et al. | 382/46 |
| 4,790,025 | 12/1988 | Inoue et al. | 382/41 |
| 4,866,784 | 9/1989 | Barski | 382/46 |

Primary Examiner—Michael Razavi
Attorney, Agent, or Firm—Dennis R. Arndt

[57] ABSTRACT

Document contour vectorization and the use of a modified Hough transform are used in combination to detect the skew angle of a digitized form image so that image skew may then be corrected in the preprocessing of form images prior to document analysis and classification.

5 Claims, 6 Drawing Sheets

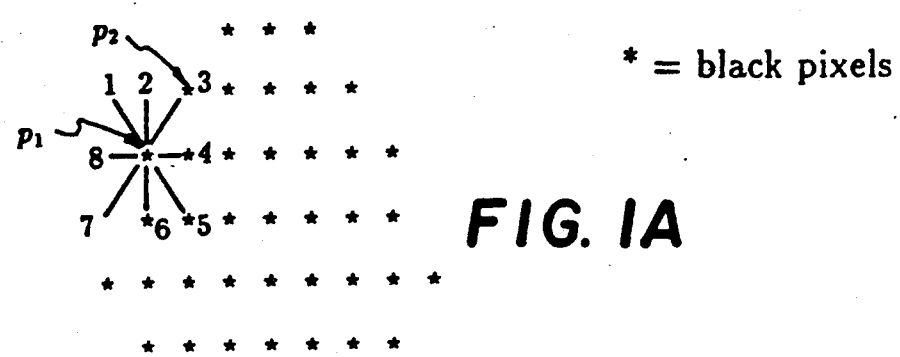
\* = black pixels
FIG. 1A
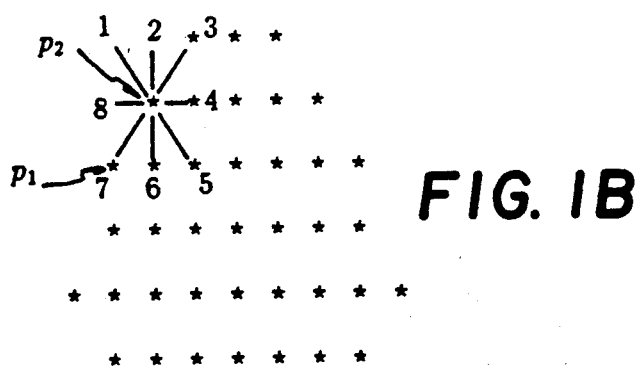
FIG. 1B
FIG. 1C

ORIGINAL DOCUMENT

AFTER TRANSLATION OF THE CENTER POINT OF THE DOCUMENT TO ORGIN

AFTER ROTATION (DESKEWING)

AFTER TRANSLATION TO ORIGINAL CENTER POINT

METHOD OF DETECTING THE SKEW ANGLE OF A PRINTED BUSINESS FORM

TECHNICAL FIELD OF THE INVENTION

The present invention relates to image processing techniques in general, and more particularly, to the automatic detection of skew in form images.

CROSS REFERENCE TO RELATED APPLICATIONS

Reference is made to commonly-assigned, copending U.S. Pat. Application Ser. No. 526,928, entitled "A Polygon-Based Technique For The Automatic Classification of Text And Graphics Components From Paper-Based Forms", and U.S. Patent Application Ser. No. 526,425, entitled "A Polygon-Based Method For Automatic Extraction Of Selected Text In A Digitized Document", each filed in the name of Yongchun Lee and filed concurrently herewith.

BACKGROUND OF THE INVENTION

Digital coding of graphic information is commonly called for in a wide variety of contexts from facsimile data transmission to computerized photograph analysis and pattern recognition, to computer-aided-design applications. The first step in such digitizing is to scan the document in a controlled fashion, measuring the graphic value of the image at each point. Currently available scanning devices are capable of substantially simultaneously delivering a binary output signal for each of n lines of resolution cells, each cell being approximately 0.01 mm square. Thus a one meter long scan line of an engineering drawing for example, would contain $10^5$ such resolution cells; a single square centimeter would contain $10^6$ resolution cells.

Where, as indicated above, the digitized information is in the form of raster output data from 0.01 mm resolution cells, a typical 80 character alphabetic line might then be coded as approximately 200 information signals for each 20 cm long scan line, a reduction of 99 percent compared to the $2 \times 10^4$ bits of raw raster output data. When it is considered that a sheet of A4 paper contains $6 \times 10^8$ such resolution cells, it can be seen that such a coding is still very cumbersome, requiring over a million information signals to code a single page of bi-tonal writing, scan line by scan line. This inefficiency is addressed in the prior art by a number of techniques which look for broader patterns by correlating the run length compressed data across a second dimension, typically by comparing contiguous adjacent scan line data and coding the difference.

Electronic document deskewing is an essential preprocessing capability necessary to enable further document processing of a digitized paper-based form. The present invention provides a fast and accurate method for detecting skew angle of the form image.

To correct a skewed image requires two processing steps: first, establishing the amount of skew and then deskewing of the image by using skew correction. The skew of a document is usually defined by the orientation of the side boundaries of the document and/or the straight lines contained in the image. Secondly, for a form document, it is predominated by straight lines which are the basic element for constructing a form or tables and the orientation of straight lines which help indicate the status of the form skew. Skew of the form image can be implied when a majority of straight lines deviate from either a horizontal or vertical direction.

To detect the orientation of straight boundaries in the past, a Hough transform was used. A direct application of this transform to a bitmap document for line detection has a major disadvantage. It requires extensive computation to make a histogram in parametric space $(\rho, \Theta)$ due to the large number of pixels. This can be prohibitive for practical applications.

DISCLOSURE OF THE INVENTION

The present invention combines document contour vectorization with the use of a modified Hough transform for the fast detection of a skew angle of a digitized form image. Skew correction is performed by a matrix multiplication.

BRIEF DESCRIPTION OF THE DRAWINGS

FIGS. 1A-1C show a pixel neighborhood and the pixel search order;

MODES OF CARRYING OUT THE INVENTION

The present invention uses a polygon-based method which overcomes many of the limitations associated with bitmap techniques mentioned earlier.

Contour vectorization converts a digitized document into a collection of polygons. This conversion requires contour pixel tracing followed by piecewise linear approximation of the contour pixels.

The contour pixel tracing operation starts by scanning pixels in a horizontal direction. Whenever a transition from 0 to 1 detected, it traces the contour in a rotational order until it returns to the starting point for the completion of a contour. The rotational order that the search is performed is illustrated in FIG. 1. The pixel $p_1$, is a transition which is detected by scanning the document page from left to right. Using a three by three grid shown in FIG. 1C with the center pixel being $p_1$ the first transition and looking in the specified search order 1-8 of FIG. 1C until the next transition is located. In this instance, $p_2$ was located in cell number 3 of the three by three grid. That pixel was located using the rule of adding a value of four to the previous direction using module 8 arithmetic, and adding one to the result. $p_2$ in FIG. 1B is now the central pixel in the three by three grid in the same search order thus locating the transition in cell 3. The next pixel in the search starting from pixel $p_2$ in direction 8. The process is repeated until a closed contour is completed. After completion of a contour tracing, scanning resumes to find the next transition and then traces the next contour. This process is repeated until the last contour has been completed.

PIECEWISE LINEAR APPROXIMATION

Figure 2A:
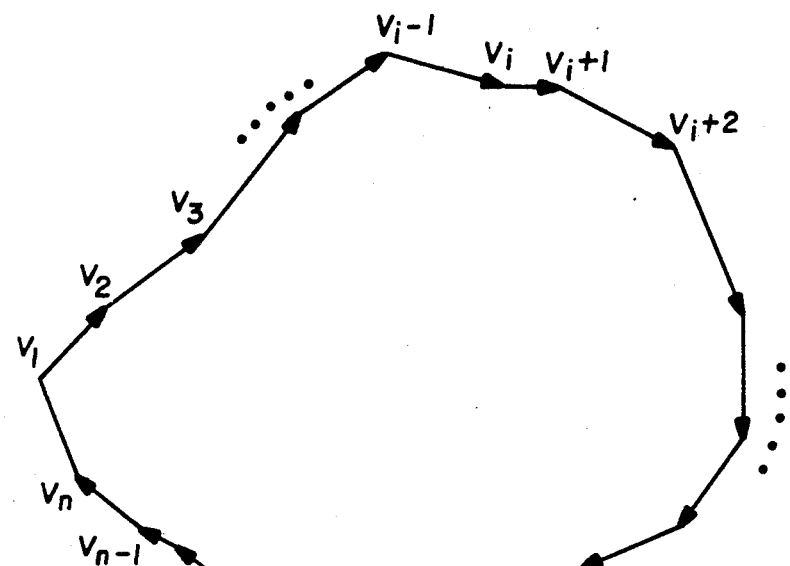
FIG. 2A illustrates graphically the linear approximation of a polygon which results in a number of short almost coincident vectors that are replaced by a single vector in their place.

The piecewise linear approximation process converts a sequence of contour pixels into a sequence of vectors by merging colinear pixels. The sequence of vectors forming a closed boundary becomes a polygon as shown in FIG. 2A. The piecewise linear approximation process is modified somewhat by imposing an inner product constraint which allows for the detection of sharp corners during iteration. Sequentially scan the contour pixel and merge the consecutive pixels which lie on the same straight line into vectors. This forms a polygon which is composed of a sequence of short vectors as shown in FIG. 2A. The vertices of a polygon are denoted by $(V_1, V_2, V_3...V_i...V_n)$. Calculation of normalized inner product of any two consecutive vectors (e.g. $V_i$ and $V_{i+1}$)

$$I_i = \frac{\overrightarrow{v_{i-1}v_i} \cdot \overrightarrow{v_iv_{i+1}}}{|\overrightarrow{v_{i-1}v_i}||\overrightarrow{v_iv_{i+1}}|} \text{ and } -1 \leq I_i \leq 1$$

By considering any three consecutive points $v_{i-1}$, $v_i$, $v_{i+1}$ and $v_{i-1}$, $v_{i+1}$ form the sides of a triangle $v_{i-1}$, $v_i$, $v_{i+1}$. The line segment $v_{i-1}$, $v_{i+1}$ is the base of $\Delta - v_{i-1}$, $v_i$, $v_{i+1}$. The height of $\Delta v_{i-1}$, $v_i$, $v_{i+1}$ serves as the deviation for approximating the series of $V_{i-1}$, $V_i$ and $v_i$, $v_{i+1}$, to $v_{i-1}$, $v_{i+1}$. If the deviation is smaller than a predetermined threshold ($\epsilon$) and $I_i$ is greater than a predetermined negative value the approximator described above is applied. Otherwise, the part $v_i$ is kept and the next two consecutive segments are exposed for linear approximation.

Figure 2B:
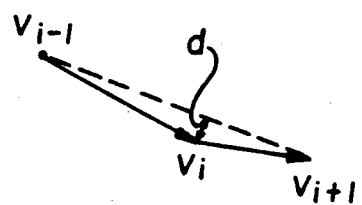
FIG. 2B illustrates how the deviation from a substitute vector is diminished.
Figure 3:
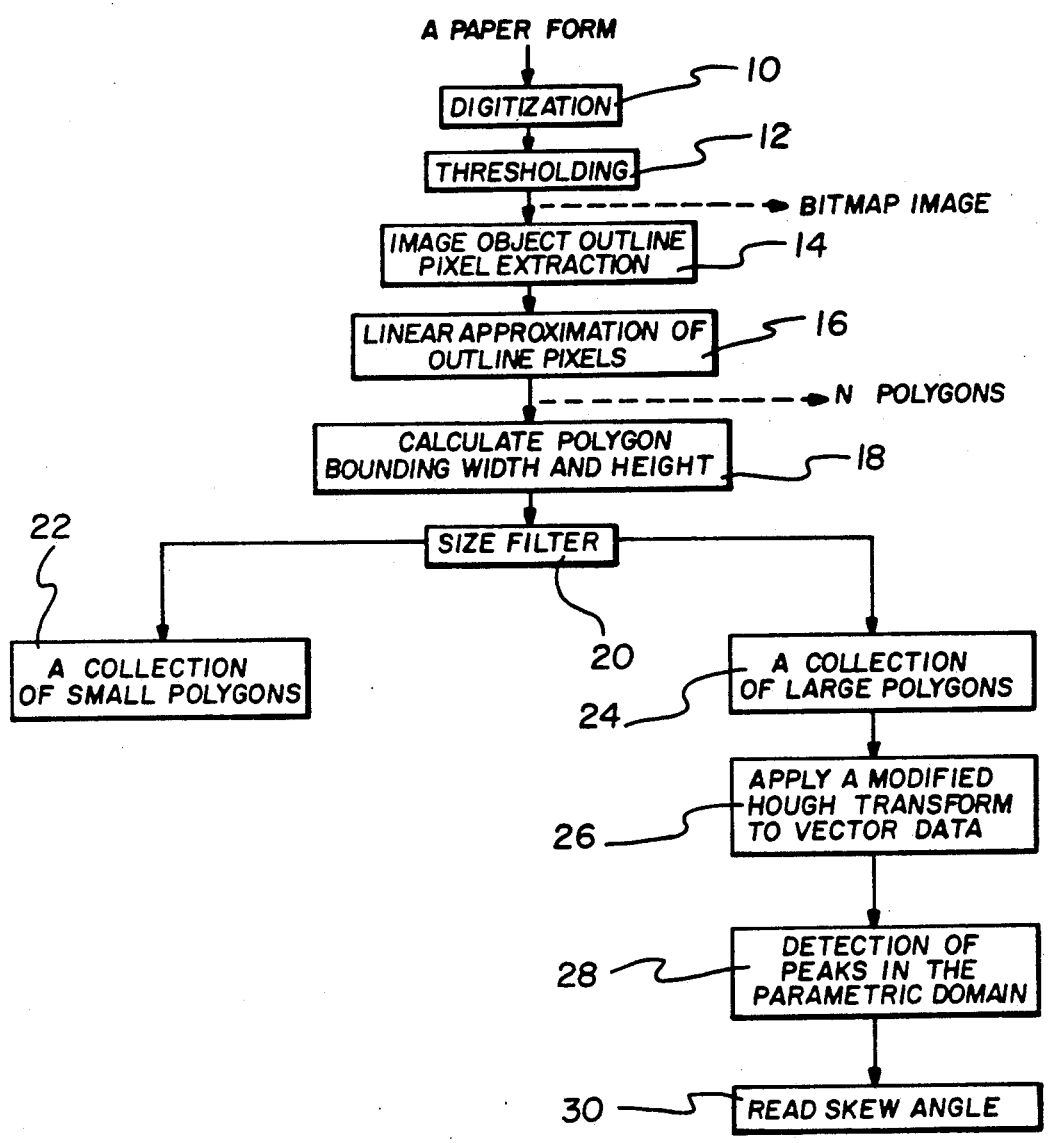
FIG. 3 is a flow diagram for the detection of skew angle.

In FIG. 2b vectors $$\overrightarrow{v_{i-1}v_i} \text{ and } \overrightarrow{v_iv_{i+1}}$$

are shown if the values for d which is the deviation from a replacement vector $$\overrightarrow{v_{i-1}v_{i+1}}$$

is below a given value, the replacement will be made. However, in the event d is above a predetermined value, the original vector will be preserved. The value of d is given by:

$$d = \frac{x_i(x_{i+1} - y_{i-1}) - y_i(x_{i+1} - x_{i-1}) + (y_{i-1}x_{i+1} - x_{i-1}y_{i+1})}{\sqrt{(x_{i+1} - x_{i-1})^2 + (y_{i+1} - y_{i-1})^2}}$$

Accordingly, the sharp corner preservation is accomplished by evaluating normalized inner product values of each of two consecutive vectors during iteration and skipping over the segment merging operator when the value is smaller than a negative threshold. The negative threshold value is selected because the inner product of edge segments at a sharp corner must be a negative value. Thus, the smaller the normalized value the sharper the corner it indicates. For this particular application, the threshold is set a ($-0.5$) in radians. By incorporating this constraint in a piecewise linear approximation, it has been found that the process preserves sharp turning acute corners while smoothing out noisy short segments. It should be noted that this capability is particularly critical when linear approximation is applied to line-like objects. It should be noted that during operation of the piecewise linear approximation algorithm, the smoothing threshold is started with one and incremented up to the predetermined value while iteration goes along in order to minimize the distorted results obtained in linear approximation.

When completed, the contour vectorization process converts a bit map image into a collection of simple polygons. The polygon representation allows for the extraction of the straight line orientation conducted in a vector domain during less data.

After the application of contour vectorization, in general, a form image will produce a number of contour polygons of widely varying sizes. A collection of closed polygons is obtained which represent object contour components (either inner or outer). The larger polygons represent the larger graphic outlines (contours of the image. The graphic outlines can be boundaries of frames or tables in the image. By applying a size filter to the collected polygons, the larger polygons which represent graphic boundaries are extracted for use in line angle detection. In a form image, these large graphical contour components are composed of straight boundary lines. Therefore, the skew angle detection of a form turns into the detection of the orientation of straight lines.

The polygon vectors associated with these graphic boundaries are inputted to a modified Hough transform for detection of straight lines. The Hough transform technique of mapping image points into a parametric domain where image structure can be easily recognized and is commonly used for straight line detection. When this line to point transformation is applied to image points, it can be used to detect image points that lie along a given straight line.

The modified version developed for this application uses the center coordinates (x,y) of each vector in the extraction of large graphical contour components. Furthermore, the angle and length of each vector are computed from the coordinates of the vector end points as prior information. Transformation of the center coordinates (x,y) of the vectors incorporated with the vector angles into the parametric $(\rho, \Theta)$ space, the speed to make a histogram is significantly improved, over application of the standard Hough transform in a bitmap document.

Figure 4A:
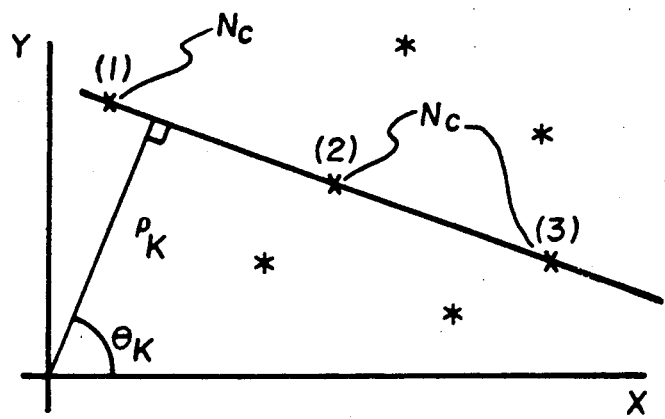
FIG. 4A is a graphical example showing three points on a form line in Cartisean space.
Figure 4B:
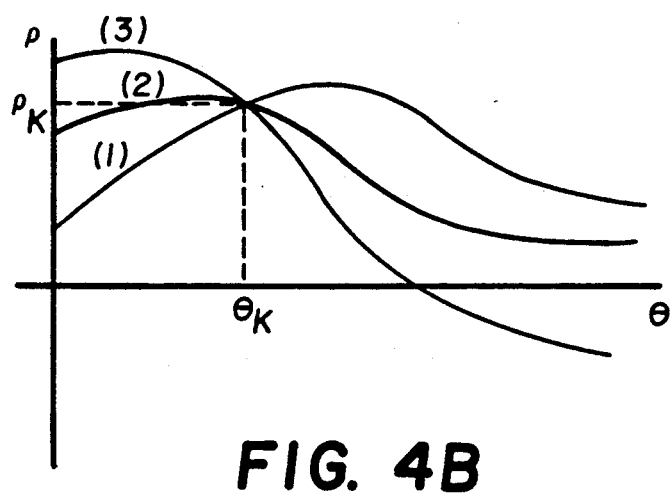
FIG. 4B is a graphical example of sinusoidal curves in parametric space corresponding to three points on the line in FIG. 4A.

The Hough transform for a point (x,y) in Cartisean space is given by:

$$\rho_k = X \cos \Theta_k + y \sin \Theta_k$$

where $\rho$ is the perpendicular distance from the origin, as shown in FIG. 4A and $\Theta$ is the inclination in degrees of that line. Thus, any line in image space is described by a point in the parametric space $(\rho,\Theta)$. Similarly, a point in Cartisean space (x,y) corresponds to a curve in parametric space. The parametric domain curves that corresponding to colinear points in the image space intersect at a common $(\rho, \Theta)$ point. The set of points, of which image points $N_c$ can be connected by a straight line, will produce a count in the Hough transform domain of magnitude $N_c$ at the position $(\rho,\Theta)$, where $(\rho,\Theta)$ describe the connecting lines.

In practice, the Hough transform of a point $(x_i, y_i)$ is performed by computing $\rho$ from the above equation for all n values of $\Theta_k$, into which $\Theta$ is quantized in m intervals of width $\Delta\rho$. In this way, a quantized sinusoidal curve is obtained and along the quantized curve each cell is incremented an equal amount. This procedure is repeated for all points. Colinear points in the image show up as peaks in the parametric $(\rho,\Theta)$ space.

The modified Hough transform used to extract straight lines takes the center points $(x_i, y_i)$ of vectors in the extracted graphic contour polygons as the point to be transformed points. This will detect sets of vectors that lie along a straight line, and it is the orientation of these detected straight lines that are used for the defining of a form document's skew angle.

MODIFIED HOUGH TRANSFORM

1. Read a previously extracted large polygon.
2. Calculate the maximum $\rho$ which is defined by equation $$\sqrt{(W/2)^2 + (H/2)^2}$$

where W=width of the encompassing rectangle and H-height of the encompassing rectangle. Next, set the origin of the point in. Cartisean space as the center point of the encompassing rectangle of the polygon.

3. Quantize the value $\rho$ into m intervals of width $\Delta\rho$, and sample the value of $\Theta$ every $\Delta\Theta$ in the range of 0° to 360°.
4. Calculate the center point coordinate $(x_i, y_i)$, vector length and angle $(\Theta_k)$ of the vector.
5. Using the center coordinates $(x_i, y_i)$ and the angle $(\Theta)$ of the vector $(\rho)$, can be computed according to Hough transform equation. Note that this is a point-to-point mapping rather than a point-to-curve mapping described previously.
6. Add the value of vector length at the coordinates $(\rho_k, \Theta_k)$ in the histogram.
7. Repeated step (4)-(6) until last vector of the polygon has been processed.
8. Peak detection from the transformed domain which is described in detecting skew angle below the peak $\Theta_p$ and is defined as the skew angle of the polygon.
9. Repeat step (1)-(8) until last polygon of the large group has been processed.
10. The document form skew angle is the average of the skew angles collected from all of the large polygons.

There are three advantages in using the algorithm set forth above: (I) There is a tremendous reduction in data points resulting from the vectorization process. This results in a substantial reduction in the computation loop in computing the Hough transform. (II) The use of vector angular information, the transformation of data points from Cartisean space (x,y) to parametric space $(\rho,\Theta)$ is a one-to-one mapping instead of one-to-multiple mappings as in the standard equation. This greatly reduces the number of processing steps in computing the accumulator array. (III) Use of a weighted accumulator can greatly enhance the peaks which correspond to more reliable long vectors and de-emphasize the noisy short vectors. This significantly improves the detectability of the peaks in parametric space $(\rho,\Theta)$.

DETECTION OF SKEW ANGLE

Figure 5A:
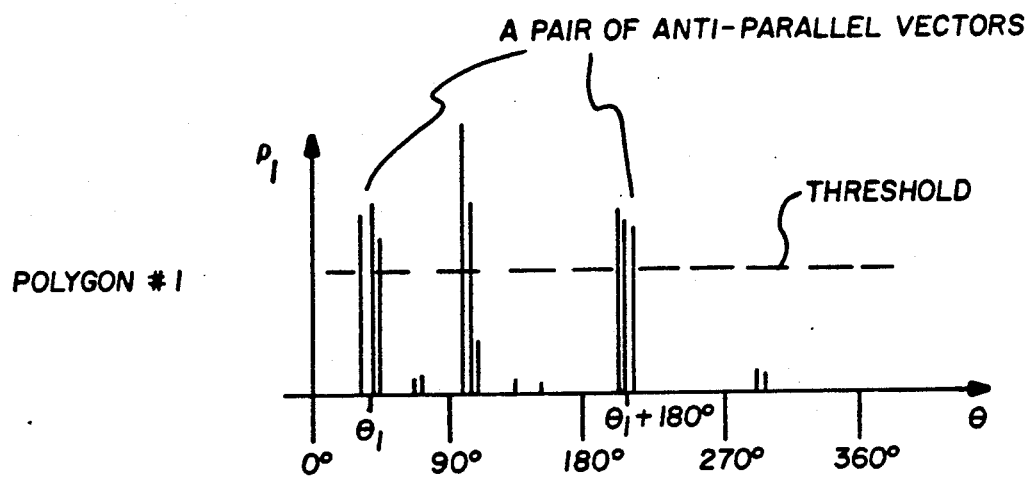
FIGS. 5A-C illustrate graphically the use of histograms in peak detection.

If a form document is skewed in a particular orientation, the value of $\Theta$ is determined when all possible values of $\rho$ are scanned and yield clusters of high peaks in the accumulation array (histogram FIG. 5A). The values of $\Theta$ associated with the clusters of peaks indicate the potential orientation of dominant contour lines which is defined as the deskew angle of the form.

Figure 5B:
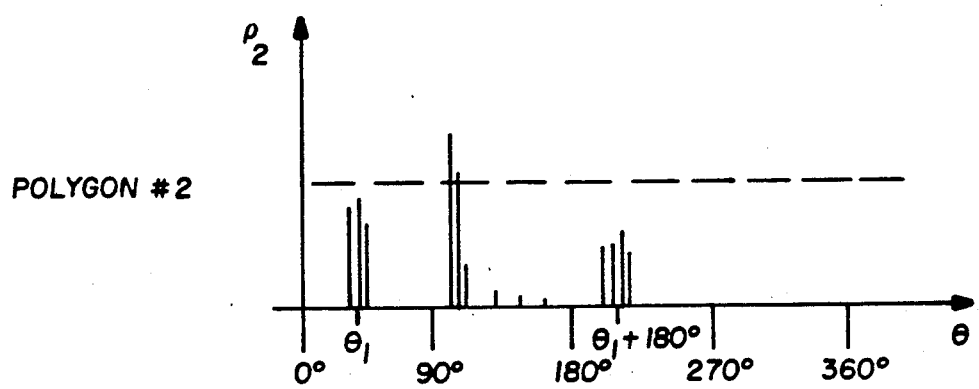
Figure 5C:
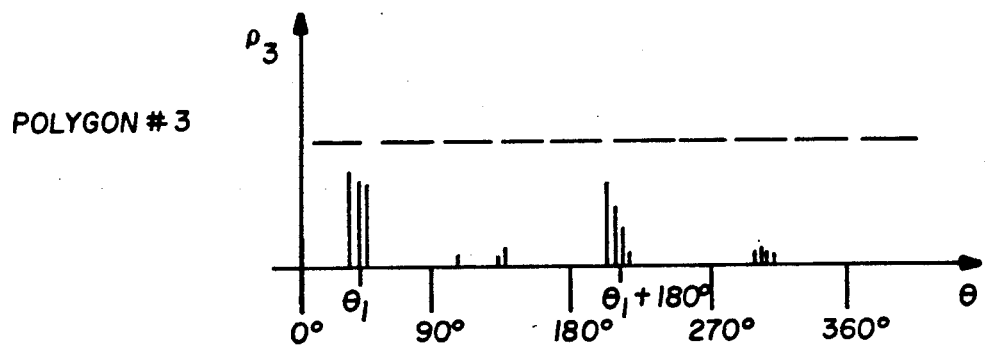

The detection of valid peaks is described by an example as shown in FIGS. 5A-5C. The example assumes that three large graphical polygons are extracted. The modified Hough transform yields three accumulator arrays corresponding to the three polygons 1, 2, and 3, respectively. By scanning all possible values of $\rho$, the majority of peaks are found at $\rho_1$, $\rho_2$ and $\rho_3$ corresponding to the polygons 1, 2, and 3, respectively as shown in FIGS. 5A-C. The values of $\Theta$ associated with the cluster of peaks indicate the orientations of major contour lines. To validate the true peak which reflects the skew angle of a form, the peak is required to meet two criteria: first, the peak value must exceed a global threshold; secondly, when the $\Theta$ value associated with the peak is added to 180°, a similar cluster of local peaks should be found. The first requirement is to ignore short segments and keep longer line segments for peak detection. The longer the segments, the more reliable the data will be. The second requirement is to avoid the false line detection which may result from slanted lines. A pair of anti-parallel vectors confirms that they are contour lines of a skewed rectangular-like box. Imposing both of these restrictions to the peaks shown in the example, only the peaks in polygon 1 meet both the criteria. The polygons 2 and 3 fail to meet both the criteria due to the peak values being smaller than the threshold or the corresponding pair is not to be found. In order to obtain better estimation of the actual skew angle, the first few highest and qualified peaks are collected and the mean of the $\Theta$ angles with the collected peaks is taken as the skew angle of the form. Note that the working range for $\Theta$ in peaks detection is confined in $60° \leq \Theta \leq 120°$ and $240° \leq \Theta \leq 300°$. The working range of $\Theta$ is dependent on the expected maximum skew angle of a form to be detected. The range of $\Theta$ defined above assumes a maximum of 30° for the skew angle of the form to be detected.

DOCUMENT SKEW CORRECTION

After the skew angle has been determined, the document skew correction on a vectorized document uses geometrical transformation that both translates and rotates vertices of each polygon by the matrix operation shown in the following equation:

$$[X_d Y_d \ 1] =$$

$$[X_o Y_o \ 1] \begin{bmatrix} 1 & 0 & 0 \\ 0 & 1 & 0 \\ -X_1 & -Y_1 & 1 \end{bmatrix} \begin{bmatrix} \cos\theta_s & \sin\theta_s & 0 \\ -\sin\theta_s & \cos\theta_s & 0 \\ 0 & 0 & 1 \end{bmatrix} \begin{bmatrix} 1 & 0 & 0 \\ 0 & 1 & 0 \\ X_1 & Y_1 & 1 \end{bmatrix} =$$

$$[X_o Y_o \ 1] \begin{bmatrix} \cos\theta_s & \sin\theta_s & 0 \\ -\sin\theta_s & \cos\theta_s & 0 \\ t_1 & t_2 & 1 \end{bmatrix}$$

wherein
$$t_1 = X_1(1-\cos\Theta_s) + Y_1 \sin\Theta_s$$

and
$$t_2 = Y_1(1-\cos\Theta_s) - X_1 \sin\Theta_s$$

The computational sequence is illustrated in FIGS. 6A-D in which the vertice of each of the polygons is rotated about the center point of the document p. The transformation process comprises a three step sequence.

Figure 6A:
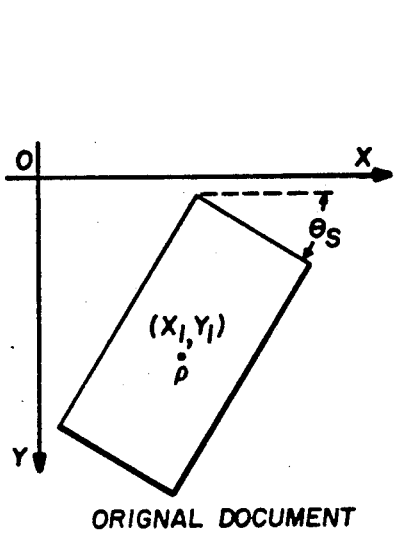
FIGS. 6A-D illustrate the transformation and skew correction for the document form.
Figure 6B:
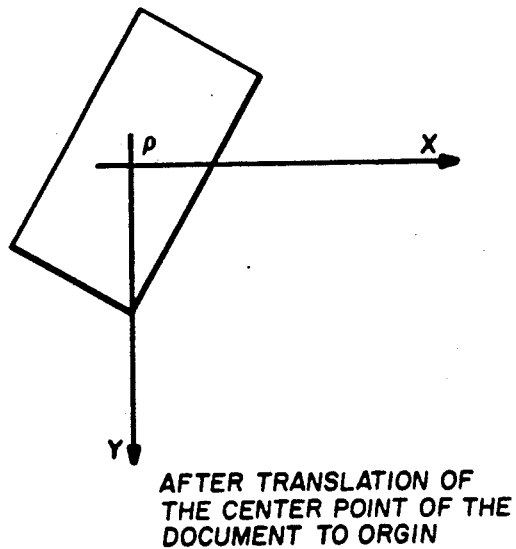
Figure 6C:
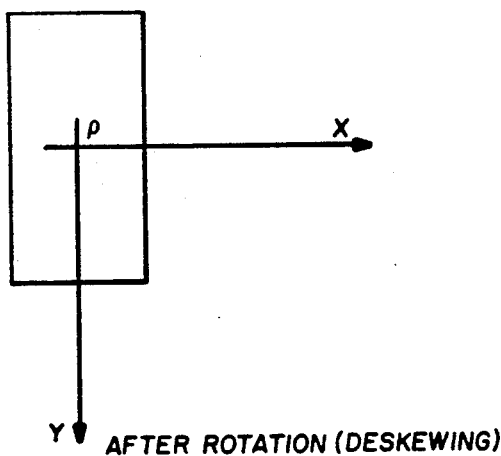
Figure 6D:
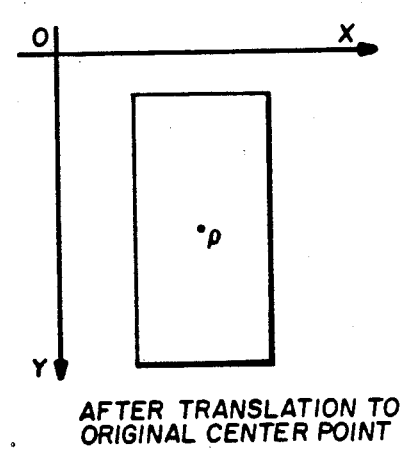

The first step performs the translation of the vertice of each of the polygons so that the center point p is at the origin as shown in FIG. 6B. The second step rotates the vertices of polygons with a degree of $\Theta_s$. The result of such a rotation is shown in FIG. 6C. FIG. 6D is the result of the third step that translates such that the point at the origin returns to the center of the document. The $(X_d Y_d)$ and $(X_o, Y_o)$ are coordinates of vertice of a polygon before and after transformation, respectively. The determined skew angle is $\Theta_s$ and the $(S_1 Y_1)$ is the coordinate of the center point P.

FLOW CHART

A paper document is scanned and digitized in step 10 to convert the document into a digital image. In step 12, a thresholding operation is applied to each pixel of the digitized image.

This produces a binary (bitmap) image. In step 14, an object contour following operation is used to extract edge pixels of objects (i.e. outlines of objects in the bitmap image. A linear approximation operation is applied next in step 16 for merging colinear contour pixels into straight segments. This results in a collection of polygons. Each polygon represents either an inner or outer contour of an object. In step 18, polygon bounding is performed which calculates the size (width and height) of a bounding polygon by subtracting the extreme coordinates of that polygon in both the horizontal and vertical directions. In step 20, a predetermined size threshold value is applied to the collection of polygons. This results in two sets of polygons. The ones collected in step 22 are collection of small polygons. The collection established in step 24 are associated with large graphic contours. Next, a modified Hough transform is applied to the polygon vectors in step 26. Use of this transform results in mapping the center coordinates of polygon vectors into a two dimensional accumulator array in a parametric domain which is easier for straight line detection. In the next step 28, the accumulator array is scanned to locate the highest peak in the parametric array. Step 30, the final step, the angular value of the highest peaks are read and that angular value is defined as the skew angle of the form document.

ADVANTAGES AND INDUSTRIAL APPLICABILITY

The present invention is useful in computer based systems that provide automated analysis and interpretation of paper-based documents. The present invention uses the geometrical spatial relationship of the contours and a modified Hough transform for the fast detection of any skew angle of a digitized form image and the skew correction is then performed. The present invention has advantages over previously applied bitmap techniques in accuracy, robustness, efficiency of data structure, storage and document analysis. Accordingly, the present invention is more appropriate in determining the skew angle of forms in the preprocessing steps of document analysis and classification.

What is claimed is:

1. A method for reliably determining the skew angle of a scanned digitized document image in a computer comprising the steps of:

thresholding the digitized image to produce a binary image;

converting the binary image into a collection of closed polygons formed by a series of vectors using contour vectorization;

determine the width and height of an encompassing rectangle for each polygon;

establish a threshold using either the height or width of the rectangle to separate all the polygons into two categories with a first category containing small polygons having either heights or widths smaller than a predetermined value and the second category of larger polygons wherein either the height or width is greater than a predetermined second value;

transforming the vectors of each polygon in the second category of polygons employing a modified Hough transform which includes a) determining the center coordinates of each vector in a given polygon from the second category of large polygons;

b) calculating the length and angle ($\Theta$) of each vector;

c) using the center coordinates and the angle of each vector in each polygon to determine the value of p in parametric space, using $p = x \cos \Theta + \sine \Theta$ and plot the histogram of (p, $\Theta$) using vector length for each vector in said polygon;

d) include on said plot of the histogram all vector lengths for all vectors in a polygon in a cumulative fashion;

e) detecting the peaks that exist at $\Theta_1$ in the parametric domain and determine if corresponding peaks exist at $\Theta_1 + 180°$; and f) repeat the steps a-e until all the large size polygons in the second category have been processed;

detecting peaks in the histogram in the parametric domain using a predetermined third threshold;

determining the angular value $\Theta$ of the peak values above said third threshold;

determining if any angular values $\Theta_1$ have additional corresponding peaks at $\Theta_1$ at 180° and if so determined, average all values of $\Theta_1$ so determined and the average value $\Theta_1$ will be defined as the skew angle of the document; and rotate the digitized document image in the computer by $\Theta_1$ degrees to properly orient the document image for further processing.

2. The method of determining skew angle of a digitized document image in a computer as set forth in claim 1 wherein said contour vectorization is comprised of the steps of contour pixel tracing and piecewise linear approximation.

3. The method of determining skew angle of a digitized document image in a computer as set forth in claim 2 wherein the center coordinates of the rectangle that encompasses the polygon is used as the origin of the Cartisean 4. The method of determining skew angle as set forth in claim 3 wherein p is the length of the line from the origin normal to the vector in the Cartisean coordinate system.

5. A polygon based method for determining the skew angle of a scanned digitized form document image in a computer comprising the steps of:

a) thresholding the digitized image to produce a binary image;

b) use contour vectorization to convert the binary image into a collection of closed polygons formed by a series of vectors;

c) determining the width and height for an encompassing rectangle that encompasses the polygon;

d) establish a threshold to separate all the polygons into two categories with the first category including smaller polygons that have either the height or width of an encompassing rectangle less than a predetermined value and the second category containing larger polygons having either the height or width of an encompassing rectangle larger than a predetermined value;

e) determining the center coordinates of each vector in each polygon from the second category or larger polygons;

f) determine the length and angle of each vector;

g) using said center coordinates and said angle of each vector in each polygon to determine the value of $\rho$ in parametric space using $\rho = X \cos \Theta + Y \sin \Theta$ and plot the histogram of $(\rho, \Theta)$ using the vector length for each vector in said polygon;

h) include on the plot of the histogram all vector lengths for all vectors in each polygon in a cumulative fashion;

i) detecting the peaks that exist in the parametrix domain and determine a corresponding value for $\Theta$;

j) repeat the steps e-i until all the larger size polygon having heights or widths of an encompassing rectangle greater than said predetermined value have been processed;

k) determine the angular values of the peaks above a predetermined threshold;

l) determine if any of the specifically determined angular values $\Theta_1$ have corresponding angular values at $\Theta_1 + 180°$ and if so determined define $\Theta_1$ as the skew angle of the document; and m) rotate the digitized document image in the computer by $\Theta_1$ degrees to properly orient the document image for further processing.

* * * * *